United States Patent Office 3,135,704
Patented June 2, 1964

3,135,704
PHOTOSENSITIVE COMPOSITIONS AND PROCESS FOR THE PRODUCTION THEREOF
Jean Leon Van Cakenberghe, Beersel, and Willy De Sutter, Brussels, Belgium, assignors to Union Carbide Corporation, a corporation of New York
No Drawing. Filed Oct. 21, 1959, Ser. No. 847,707
5 Claims. (Cl. 252—501)

The present invention relates to a novel photosensitive composition and, more particularly, to a novel crystalline form of indium sulfide which exhibits photosensitive properties, and a method for producing same.

Heretofore, indium sulfide has usually been produced either by direct synthesis or chemical precipitation. The indium sulfide produced by these methods has been found to contain an excess of indium, and therefore exists predominantly in a cubic crystalline form. Also, indium sulfide as produced by these conventional techniques has not been known to show especially useful photosensitive properties.

It is, therefore, the main object of the present invention to provide a novel crystalling structure of indium sulfide whereby novel photosensitive properties are obtained.

Another object of the invention is to provide novel indium sulfide compositions exhibiting substantially enhanced photosensitive properties by the addition thereto of certain additive materials.

A further object of the invention is to provide a method for producing a novel crystalline structure of indium sulfide exhibiting novel photosensitive properties.

A further object of the invention is to provide a method for producing a novel crystalline structure of indium sulfide containing certain additives which enhance the photosensitive properties of the novel composition.

A further object of the invention is to provide a novel photosensitive element for use in photosensitive apparatus, whereby variations in radiant energy can be detected.

Other aims and advantages of the present invention will be apparent from the following description and appended claims.

In accordance with the present invention, there are provided novel photosensitive compositions comprising a tetragonal crystalline form of indium sesquisulfide, a method for producing the novel compositions, and a novel use of such compositions.

It has been found that when indium sulfide is prepared by a melting process under carefully controlled conditions, e.g., under controlled sulfur pressure, the resulting indium sulfide is not in the customary cubic crystalline form, but in a novel tetragonal crystalline form which exhibits definite photosensitive properties. This result contrasts sharply with the indium sulfide obtained when no precautions are taken in the preparation, where an excess of indium is usually obtained with respect to the stoichiometric composition represented by $In_2S_3$, and the crystals obtained are predominantly cubic in form. Furthermore, the electrical conductivity of the conventional cubic crystalline form increases as the indium content increases. The resistance of the cubic crystals is ordinarily from about one to 100 ohms/cm., and these values do not significantly vary when the crystals are irradiated. The tetragonal crystalline form obtained under the controlled conditions, however, has shown a resistance in the dark of about 100 megohms/cm., and a resistance in daylight of about one megohm/cm., or less.

The photosensitive properties of the tetragonal crystalline form of indium sesquisulfide can be made even more desirable by adding minute quantities of certain elements to the inventive composition. Such additives can be the metals copper, silver, gold, zinc, cadmium, mercury, germanium, tin, and lead, and/or the nonmetals nitrogen, phosphorous, arsenic, antimony, fluorine, chlorine, bromine, iodine, and astatine. Any number of these elements can be added, and the addition of a metal does not require a balancing addition of a nonmetal. However, the total addition of the above elements should not be substantially greater than one atom percent, and should preferably be between 0.01 and 0.2 atom percent. The criterion for selecting the type and amount of additive is simply the type of photosensitive properties desired. However, it appears that the preferred metals to be added are usually copper and tin.

The specific conductivity of the composition formed by the addition of the above elements to the tetragonal indium sesquisulfide has been measured as less than $10^{-5}$ mhos in the dark, and the ratio of the specific conductivity in daylight to that in the dark is usually greater than 100.

Another means of increasing the desirability of the tetragonal crystalline form of indium sesquisulfide is to combine the inventive composition with a relatively large amount of another semiconductor material. The crystalline structure of the composition obtained by this combination varies with the semiconductor used, but it has been observed that combining the tetragonal indium sesquisulfide with chalcogenides of calcium or mercury produces photosensitive crystals having a cubic structure.

Typical semiconductors which can be combined with either the tetragonal indium sesquisulfide or indium and sulfur in appropriate amounts so as to be closest to the stoichiometric composition represented by $In_2S_3$ are those represented by the formula $(A^{II})(B^{VI})$ and $$[(C^{III})_2(B^{VI})_3]$$

wherein $A^{II}$, $B^{VI}$, and $C^{III}$ represent elements belonging respectively to the $II^B$, $VI^A$, and $III^A$ sub-groups of the periodic table as set forth inside the front cover of the Merck Index, sixth edition. Examples of useful semiconductors are chalcogenides of zinc, cadmium, mercury, gallium, thallium, aluminum and divalent lead. The ratio of the number of molecules of semiconductor to the number of molecules of indium sesquisulfide should be between 0.1 and 1.5, and preferably between 0.9 and 1.1. The type and amount of semiconductor added to the composition are determined by the photosensitive properties which are desired. For example, mixing CdS with the tetragonal indium sesquisulfide to form $CdIn_2S_4$ yields a composition whose photosensitive properties are very desirable when the material is exposed to yellow light. Comparable mixing with HgS yields a composition more sensitive in the infrared region of the spectrum.

As mentioned above, the tetragonal crystalline form of indium sesquisulfide displaying photosensitive properties is obtained when prepared by a hereinafter described procedure which consists essentially of a melting process performed under controlled sulfur pressure. In this novel method of producing indium sulfide, appropriate amounts of indium, sulfur, and any other desirable material, such as copper, tin, CdS, $In_2S_3$, etc., are placed into a container such as an elongated quartz tube or ampoule which has been evacuated and sealed. The materials are then heated together to a temperature slightly higher than the melting point of the composition to be produced while maintaining a portion of the container, for instance one end, at a temperature relatively lower than the rest of the container. By this temperature gradient the melting is performed under a certain pressure of sulfur, which should be in the range of one to fifty atmospheres, and preferably in the range of five to twenty atmospheres. The cooler portion of the container is then progressively raised to the temperature of the warmer portion, whereby a homogeneous melt is obtained. This melt is then cooled down to room temperature, thereby preventing the sulfur from escaping from the crystal lattice.

Two furnaces or a double furnace having two independent and adjustable heating systems is a convenient means for use in the aforementioned process, although any other convenient heating system can be used. In order to minimize the risk of damaging explosions, it is advisable to surround the tube or ampoule with a second tube or ampoule properly evacuated and sealed.

The hereinbefore described process is not restricted to preparations using indium, sulfur, or any other desirable material in elemental form, but is equally applicable to preparations wherein the final composition is produced by adding the appropriate amounts of the requisite materials directly to indium sulfide.

The unexpected photosensitive properties recognized in the novel composition produced by the inventive method described herein have led to various novel uses for the inventive composition. One of these uses is as the photosensitive element in photosensitive devices wherein variations in radiant energy are detected, such as photo-cells. Those compositions which are particularly sensitive to energy of the infrared region of the spectrum can be used as the sensitive lement in devices used to detect infrared radiations, such as fire-detectors, safety equipment, infrared directional elements, or similar devices. Another novel use for the composition is as the photosensitive element in industrial television cameras where high-resistance materials are generally required; in this case large single crystals of tetragonal indium sesquisulfide provide especially valuable properties. Other novel uses of the photosensitive compositions of the present invention are as elements in picture amplifiers both in the X-ray and infrared portions of the spectrum and in various kinds of photocopying equipment. In each of these novel uses the inventive composition can be utilized only because the resistance of the composition varies with the radiant energy to which it is subjected.

The hereinbefore described procedure has been employed in the preparation of the following illustrative examples which give an indication of the photosensitive properties obtainable according to the teachings of the present invention.

A sample of $In_2S_3$ was prepared according to the aforementioned method. The X-ray diffraction pattern of the sample differed from that given by a cubic structure and included additional lines which normally correspond to a tetragonal structure. These lines indicated diffraction angles of about 10° 50′, 17° 14′, and 21° 54′. The resistance was 200 megohms when measured in the dark and 1 megohm in the daylight.

A sample of $In_2S_3$ containing 0.1 atom percent of copper and 0.1 atom percent of tin was prepared according to the inventive method. This sample had a conductivity of $0.5 \times 10^{-7}$ mhos in the dark and $0.5 \times 10^{-3}$ mhos when exposed to daylight. The conductivity $\delta$ of the sample could be expressed in terms of light intensity L according to the formula $\delta = L^\alpha$, where $\alpha$ had the following values:

For X-rays $\alpha = 1.0$
For blue light $\alpha = 0.6$
For green light $\alpha = 0.5$
For red light $\alpha = 0.44$
For infrared light $\alpha = 0.38$ The crystals displayed a sensitivity to radiations extending up to the infrared region of the spectrum (up to 1.5 microns).

A sample of $CdIn_2S_4$ was prepared by mixing $In_2S_3$ and CdS in the molecular ratio of one to one according to the inventive method. The resultant composition had a resistance of $5 \times 10^{12}$ ohms in the dark and $10 \times 10^6$ ohms when exposed to daylight.

A sample prepared according to the inventive method and composed of 90% $In_2S_3$ and 10% $Ga_2S_3$ had a resistance of $3 \times 10^9$ ohms in the dark and $10 \times 10^5$ ohms in the daylight.

The photosensitive compositions of the present invention are substantially uniform and easily reproducible. The radiation spectrum to which they are sensitive ranges from gamma radiations to infrared radiations with a response velocity of about one thousandth of a second or higher. In many instances the photosensitive characteristics are more attractive than those of such widely used photosensitive materials as cadmium sulfide.

The indium sesquisulfide of the present invention also offers the advantage of being practically insensitive to mechanical treatment. In fact, the novel composition can be cast, compressed, grounded, cut to any desirable size or shape, or mechanically processed without suffering appreciable deterioration. It can also be incorporated in various materials such as plastic films, paints, adhesives, or fabrics, or deposited onto any base by various means such as evaporation.

We claim:
1. A process for producing photosensitive indium sesquisulfide comprising melting together under a sulfur pressure of between one and fifty atmospheres a mixture of about 40 atom percent indium and about 60 atom percent sulfur, said melting being carried out at a temperature at least as high as the melting point of the composition to be produced.
2. The process of claim 1 wherein said mixture contains less than one atom percent in the aggregate of at least one element selected from the group consisting of copper, silver, gold, zinc, cadmium, mercury, germanium, tin, lead, nitrogen, phosphorus, arsenic, antimony, fluorine, chlorine, bromine, and iodine.
3. The process of claim 1 wherein said mixture contains a chalcogenide of at least one element selected from the group consisting of zinc, cadmium, mercury, and divalent lead in an amount such that the ratio of the number of molecules of chalcogenide to the number of molecules of indium sesquisulfide is between 0.1 and 1.5.
4. A photosensitive composition consisting essentially of homogeneous crystalline $In_2S_3$ containing a chalcogenide of at least one element selected from the group consisting of gallium, thallium, and aluminum in an amount such that the ratio of the number of molecules of chalcogenide to the number of molecules of $In_2S_3$ is between 0.1 and 1.5.
5. A photosensitive composition consisting essentially of a homogeneous tetragonal crystalline form of indium sesquisulfide and between about 0.01 and 0.20 atom percent in the aggregate of at least one element selected from the group consisting of copper, silver, gold, zinc, cadmium, mercury, germanium, tin, lead, nitrogen, phosphorus, arsenic, antimony, fluorine, chlorine, bromine, and iodine.

References Cited in the file of this patent
UNITED STATES PATENTS

| | | |
|---|---|---|
| 2,676,111 | Reynolds | Apr. 20, 1954 |
| 2,676,112 | Middleton et al. | Apr. 20, 1954 |
| 2,844,543 | Fotland | July 22, 1958 |
| 2,847,329 | Schilberg et al. | Aug. 12, 1958 |
| 2,916,678 | Bube et al. | Dec. 8, 1959 |

OTHER REFERENCES

Mellor: "Comprehensive Treatise on Inorganic and Theoretical Chemistry," vol. 5C (Part I), published by Longmans, Green and Company, 39 Paternoster Row, London E.C. 4, 1924, page 403.

Chemical Abstracts, vol. 44, 1950, page 4327e; abstract of article by Kolomiets et al., entitled, "Photoelectric Properties of Indium Sulfide and Selenide," printed in Zhur. Teh. Fiz., vol. 17, pages 987–92 (1947).

Chemical Abstracts, vol. 46, 1952, p. 7451d; abstract of article by Hahn et al., entitled "Investigations of Ternary Chalcogenides," printed in Z. anorg. u. allgem. Chem., vol. 263, pp. 177–90 (1950).

Reynolds et al.: "Preparation and Properties of Indium Sulphide Phosphors," Phys. Rev., vol. 86, sec. series, 1952, page 659.